Dec. 13, 1927.
A. L. PUTNAM
FOUR-WHEEL BRAKE
Filed March 10, 1924
1,652,214
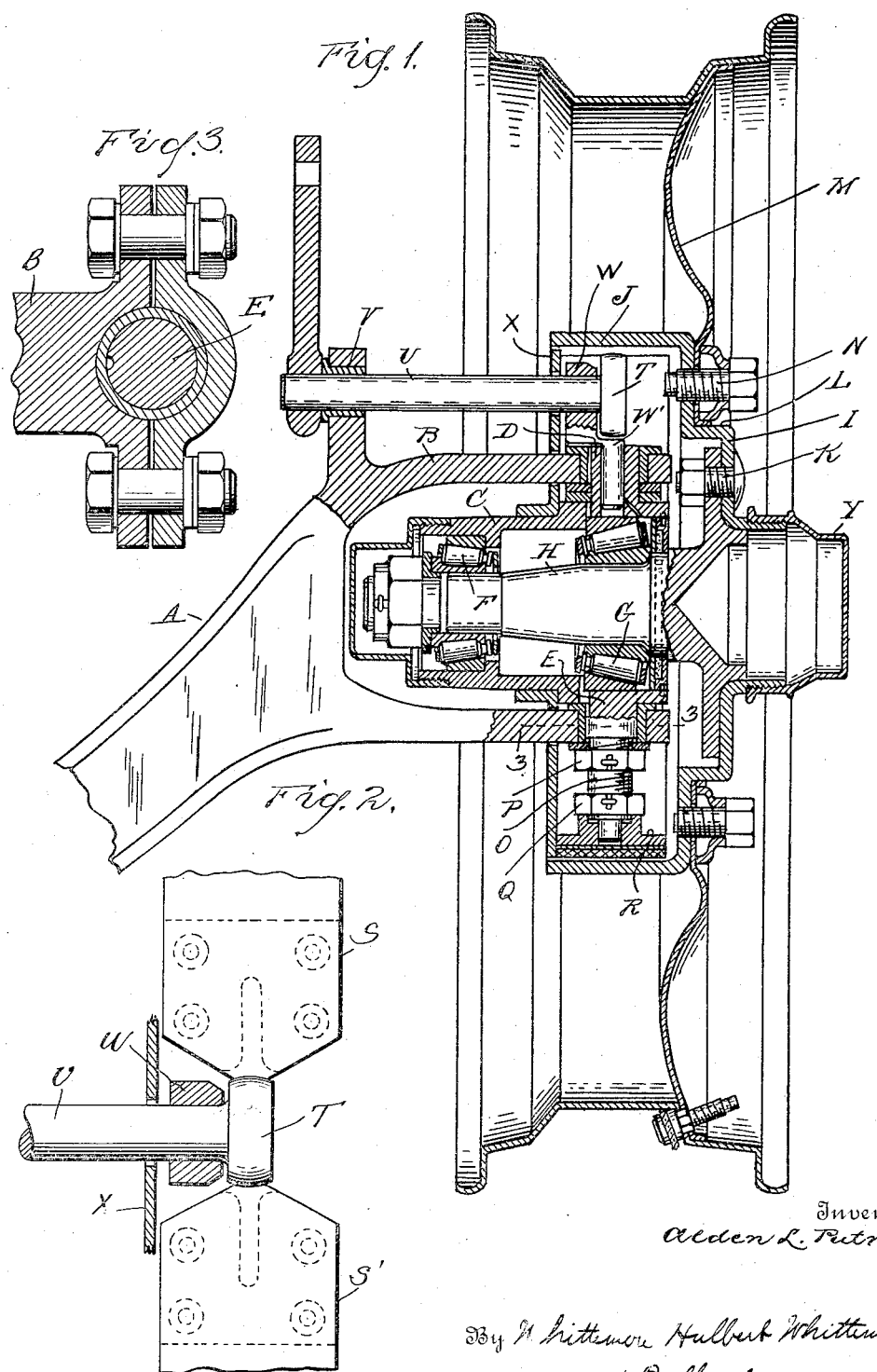
Inventor
Alden L. Putnam
By Whittemore Hulbert Whittemore
& Belknap   Attorneys Patented Dec. 13, 1927.

1,652,214

UNITED STATES PATENT OFFICE.

ALDEN L. PUTNAM, OF LANSING, MICHIGAN, ASSIGNOR, BY MESNE ASSIGNMENTS, TO STEEL WHEEL CORPORATION, OF LANSING, MICHIGAN, A CORPORATION OF MICHIGAN.

FOUR-WHEEL BRAKE.

Application filed March 10, 1924. Serial No. 698,318.

The invention relates to four-wheel brakes and consists in the novel construction as hereinafter set forth.

In the drawings:

Figure 1 is a vertical cross section through a portion of the axle and wheel including the brake mechanism;

Figure 2 is a plan view of the cam actuating mechanism for the brake shoes;

Figure 3 is a horizontal section on line 3—3 of Figure 1.

In the construction of four-wheel brakes it is advantageous to arrange the king pin in the central plane of the wheel and also centrally of the brake drum. Such a construction as ordinarily applied necessitates a considerable outward extension of the hub so as to provide for the spindle and its bearings. With my improved construction this extension is avoided by the substitution of a hollow member for the rockable spindle and by attaching the spindle to the wheel and extending it inward therefrom into said hollow member. Thus the outward extension of the hub will be less than with usual constructions and the structure also possesses other advantages as hereinafter set forth.

In detail, A is the front axle, which is provided with the bifurcated end B. C is a hollow member between the furcations provided with vertically extending trunnion portions D and E for respectively engaging the upper and lower furcations. This hollow member may be similar in construction to a barrel hub, being provided with roller or other anti-friction bearings F and G. H is a spindle for engaging the bearings F and G, which spindle extends inwardly into said hollow member and is provided at its outer end with a radially extending flange I for securing it to the wheel. As shown, a cupped brake drum J is directly mounted upon the flange I by means of the bolts K or other securing devices. This drum is preferably formed with the annular offset L, which forms a cylindrical seat for a disk wheel M, which wheel is demountably secured to the drum by the tap screws N or other securing devices. The rim of the wheel may be of any suitable construction.

The lower trunnion E is preferably extended beyond the furcation of the axle to form an anchorage for the brake shoes. As shown, this extension O is preferably threaded to receive the nuts P and Q, the former being for adjustment of the trunnion bearing and the latter for adjustment of the brakes. Thus the anchor member R slidably engages the end portion of the extension O and the nut Q forms an adjustable radial thrust bearing therefor.

The brake shoes S and S' are of the usual internal construction and are applied by the pressure of a cam located between the free ends thereof. This cam T is upon a rock shaft U extending inwardly from the brake drum, being journaled at V on the axle. There is also a second journal bearing W which is arranged within the brake drum and is preferably provided with a radially inwardly extending spindle W' engaging and swiveled in an axial recess in the trunnion D.

The brake mechanism within the drum J is preferably enclosed by a cover plate X which is mounted upon the hollow member C and is slotted for the passage of the furcations B and the rock shaft U. The outer end of the spindle H may be provided with an ornamental hub cap Y, which, however, performs no function.

With the construction as described, the hollow member C may be provided with the usual connections to the steering mechanism (not shown) and in operation will be turned about the trunnions D and E, which form the king pin. This rocking movement is communicated to the spindle, wheel and brake drum, but inasmuch as the cam T is arranged at the axis of the trunnion, there will be comparatively slight relative movement between said cam and the brake shoes. Thus in all positions of angular adjustment the cam will be in operative engagement with said brake shoes so that braking pressure may be applied by the rocking of the shaft U.

What I claim as my invention is:

1. The combination with an axle having a bifurcated end portion, of a hollow member between the furcations, vertically extending trunnions on said hollow member journaled in said furcations, a wheel, a spindle projecting inward from said wheel journaled in said hollow member and having its axis intersecting the axis of said trunnions, a brake drum on said wheel, brake shoes for engaging said drum, an anchorage for said brake shoes formed by an extension of one of said trunnions, and means axially aligned with the other of said trunnions for actuating said shoes.

2. The combination with an axle having a bifurcated end, of a hollow member between the furcations, vertical trunnions on said hollow member engaging said furcations, a wheel, a spindle on said wheel projecting inward therefrom and journaled in said hollow member, a brake drum on said wheel, brake shoes for engaging said drum, an extension of one of said trunnions forming an anchorage for said brake shoes, said extension having a screw-threaded portion, nuts engaging said screw-threaded portion for respectively adjusting said trunnion relative to said furcations and for adjusting said brake shoes relative to said drum, a cam located in axial alignment with the other of said trunnions, a rock shaft on which said cam is mounted, and a journal for said rock shaft having a swivel engagement with said trunnion.

3. The combination with an axle having a bifurcated end, of a hollow member between the furcations, vertical trunnions on said hollow member engaging said furcations, a wheel, a spindle on said wheel projecting inward therefrom and journaled in said hollow member, a brake drum on said wheel, brake shoes for engaging said drum, an extension of one of said trunnions forming an anchorage for said brake shoes, the other of the said trunnions being formed with a socket, a brake actuating member, a rock shaft on which said member is mounted and a journal for said rock shaft having a swivel engagement in the socket in the last mentioned trunnion.

In testimony whereof I affix my signature.

ALDEN L. PUTNAM.